(12) United States Patent
Thompson

(10) Patent No.: US 8,087,352 B2
(45) Date of Patent: Jan. 3, 2012

(54) ROTISSERIE SPIT

(76) Inventor: Rhett Linton Thompson, Nar Nar Goon (AU)

( * ) Notice: Subject to any disclaimer, the term of this patent is extended or adjusted under 35 U.S.C. 154(b) by 888 days.

(21) Appl. No.: 12/104,206

(22) Filed: Apr. 16, 2008

(65) Prior Publication Data

US 2009/0025573 A1    Jan. 29, 2009

Related U.S. Application Data

(60) Provisional application No. 60/912,377, filed on Apr. 17, 2007.

(51) Int. Cl.
*A47J 37/04* (2006.01)
(52) U.S. Cl. ........................ 99/421 H; 99/421 R; 99/419
(58) Field of Classification Search ............... 99/419, 99/421 R, 421 A, 421 H, 421 HV; 126/30, 126/29, 25 AA, 25 A
See application file for complete search history.

(56) References Cited

U.S. PATENT DOCUMENTS

| | | | | |
|---|---|---|---|---|
| 2,486,345 A * | 10/1949 | Triulzi | ..................... | 99/421 HV |
| 2,522,223 A * | 9/1950 | Hardin et al. | .............. | 248/124.2 |
| 2,705,450 A * | 4/1955 | Steinbook | ....................... | 99/340 |
| 2,887,944 A * | 5/1959 | Walker | ..................... | 99/421 HH |
| 4,083,354 A * | 4/1978 | Claire et al. | ..................... | 126/30 |
| 4,553,525 A * | 11/1985 | Ruble | .............. | 126/30 |
| 4,815,367 A * | 3/1989 | Hanson et al. | .............. | 99/421 H |
| 4,892,032 A * | 1/1990 | Jerome | ..................... | 99/421 HV |
| 5,649,475 A * | 7/1997 | Murphy et al. | .............. | 99/421 H |

* cited by examiner

*Primary Examiner* — Reginald L Alexander
(74) *Attorney, Agent, or Firm* — Knobbe Martens Olson & Bear LLP

(57) ABSTRACT

A rotisserie spit including a spit rod for supporting food, a carrier bracket for mounting the spit rod in cantilever fashion by bearings to permit rotation of the spit rod, the bracket being mounted to an upright support post such that the bracket and spit rod carried thereby can swing about the axis of the post, and a motor coupled to the spit rod for driving the spit rod in rotation about its axis.

10 Claims, 7 Drawing Sheets

ROTISSERIE SPIT

CROSS-REFERENCE TO RELATED APPLICATIONS

This application claims priority under 35 U.S.C. 119(e) to U.S. Provisional Application 60/912,377 filed on Apr. 17, 2007.

BACKGROUND OF THE INVENTION

1. Field of the Invention

This present invention relates to a rotisserie spit, and more particularly, to a portable rotisserie spit that that is able to be assembled for use and disassembled for storage and transport.

2. Description of the Prior Art

Rotisserie spits that rotate food while cooking are commonly used to roast food, particularly meat, over a heat source. The rotational action of such spits advantageously promotes both uniform cooking of the food and retention of the food's natural juices.

SUMMARY OF THE INVENTION

Preferred forms of the present invention seek to provide a portable rotisserie spit suitable for use outdoors that is able to be assembled for use and disassembled for storage and transport.

According to the invention, there is provided a rotisserie spit including a spit rod for supporting food, a carrier bracket for mounting the spit rod in cantilever fashion by bearings to permit rotation of the spit rod, the bracket being mounted to an upright support post such that the bracket and spit rod carried thereby can swing about the axis of the post, and a motor coupled to the spit rod for driving the spit rod in rotation about its axis.

Further according to the invention, there is provided a rotisserie spit including:
- a spit rod for supporting food;
- a carrier bracket to which the spit rod is able to be removably mounted so that the rod extends substantially horizontally from the bracket in a cantilever fashion for rotation about its longitudinal axis, the carrier bracket including first and second low-friction stationary bearing surfaces which support the spit rod in cantilever fashion from the bracket and which slidingly contact axially spaced circular portions of the spit rod;
- a motor for rotatably driving the spit rod; and
- a support for mounting the carrier bracket at an elevated position so that the spit rod can project from the bracket over a heat source.

The low-friction stationary bearing surfaces provide an inexpensive way of mounting the spit rod from the carrier bracket whilst enabling ease of assembly and disassembly of the rotisserie spit.

When the spit rod is removed from the carrier bracket, the rotisserie spit may be stored in a compact disassembled condition where the spit rod and the support are separate from one another. This may allow the parts of the disassembled rotisserie spit to be conveniently packed together in a compact bag to facilitate transport and/or storage of the rotisserie spit.

The first and second bearing surfaces may be defined by spaced upwardly facing and downwardly facing bases of respective first and second open-ended recesses formed in the carrier bracket.

The carrier bracket may be in the form of a housing having bearing plates or inserts in which the first and second recesses are respectively formed. In one practical form, the housing may be formed from a single piece of sheet metal stamped and bent to the required shape, and the bearing plates or inserts which are attached to the housing formed from a relatively high-strength low-friction material that is heat resistant to the temperatures to which it will be exposed during cooking. For example, the plates or inserts may be formed from fibre-filled nylon or other composite materials.

Preferably, each plate or insert tapers in a region in which the bearing surface is formed so that the bearing surface is defined by an edge that is thinner than the rest of the plate or insert. The thinner bearing edges reduce the areas of sliding contact between the respective edges and the corresponding portions of the spit rod to minimize frictional force inhibiting rotation of the spit rod.

The support for mounting the bracket may be a cylindrical post, a lower end of which is adapted to be driven into the ground. Preferably, the carrier bracket is removably mounted to the post. Preferably, the carrier bracket is rotatably mounted to the post to provide for rotation of the carrier bracket and the spit rod about the axis of the post so as to swing the spit rod away from the heat source.

Preferably, the spit rod is formed by a cylindrical rod that is able to skewer food.

Preferably, the motor is removably mounted to the rod so that the motor and the rod are able to be separated for transport and/or storage. The motor may have a driving socket that is able to releasably receive a complementarily driven formation at an inner end of the spit rod. While the driven formation may be formed by machining the inner end of the spit rod, it may alternatively be formed by attaching a separately formed component, for example a molded component, onto the end of the rod.

In practice, the rotisserie spit may carry one or more food-engaging skewers mounted to the spit rod so as to be slidable along the rod to be secured in selected positions, the skewer(s) having prongs that are able to be thrust into a food item.

Preferably, the skewer includes a spring collar for application around the spit rod. The collar is able to resiliently contract onto the rod to secure the skewer at a selected position. A pair of parallel prongs extending from the collar to engage the food item are able to be squeezed together against the resilience of the collar to expand the collar to facilitate movement of the collar relative to the rod.

The skewer may be integrally formed from a piece of spring wire, with the collar being formed in the manner of a coil spring having one or more turns, and the two prongs formed by end portions of the wire extending form the coil spring.

In use, the position of the skewer with respect to the rod may be adjusted by squeezing together the prongs to loosen the coil spring. The skewer may then be slid along or rotated about the axis of the rod, and the prongs thrust through the food item.

Preferably, the prongs extend from the collar in a direction generally parallel to the axis of the rod. To facilitate the squeezing together of the prongs to loosen the collar, the prongs are preferably provided with respective ear portions extending transversely form the prongs for engagement between the thumb and forefinger of the hand. The ear portions can be simply formed by bending the wire from which the skewer is formed.

This form of food-engaging skewer can also be applied to a conventional rotisserie spit having a spit rod that is mounted at both ends, as opposed to the cantilever mounting of the spit rod of the rotisserie spit discussed above.

Accordingly, a further aspect of the present invention provides a food-engaging skewer for holding food relative to a spit rod including a spring collar for application around the rod, the collar being able to resiliently contract to the rod to secure the skewer in a selected position along the rod, and substantially parallel prongs extending from the collar for thrusting through a food item, wherein the prongs are able to be squeezed together against the resilience of the collar to expand the collar to facilitate movement of the skewer relative to the rod.

According to a further aspect of the invention there is provided an attachment mountable to a spit rod of a rotisserie spit for use in cooking vegetables and other product, the attachment comprising a tubular cage mountable to the spit, the cage being loadable with product to be cooked via an access opening which can be closed whereby product within the cage can be cooked with a tumbling action upon rotation of the spit.

In one preferred form, the cage is closed at its inner and outer ends by an end cap, the end cap at the inner end has a fitting for mounting of the attachment to the outer end of the spit rod and the cap at the outer end provides a lid for loading and unloading of product.

BRIEF DESCRIPTION OF THE DRAWINGS

The present invention will be described, by way of non-limiting example only, with reference to the accompanying drawings in which.

DESCRIPTION OF THE PREFERRED EMBODIMENTS

Figure 1:
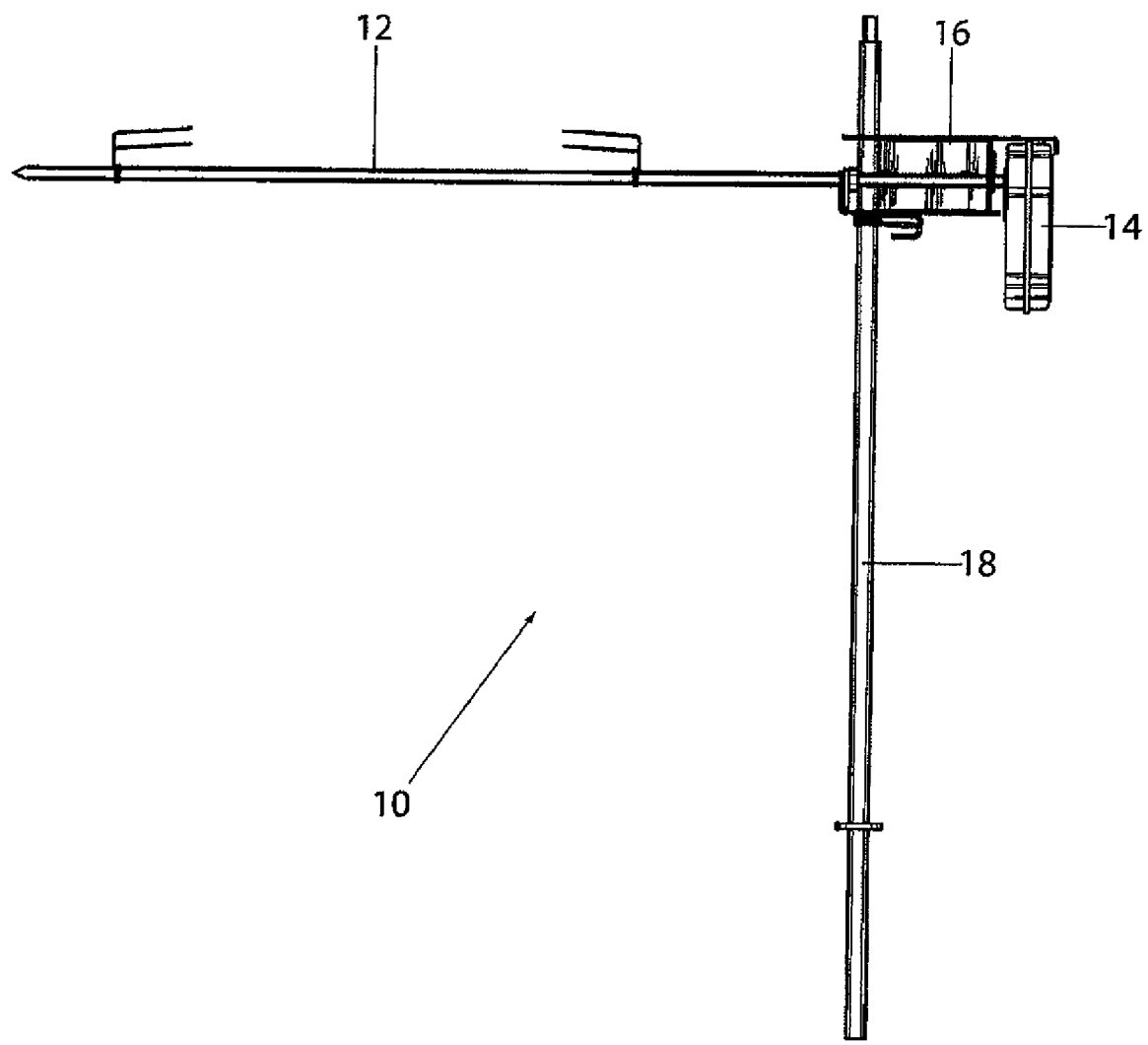
FIG. 1 is a view of an assembled rotisserie spit.
Figure 2:
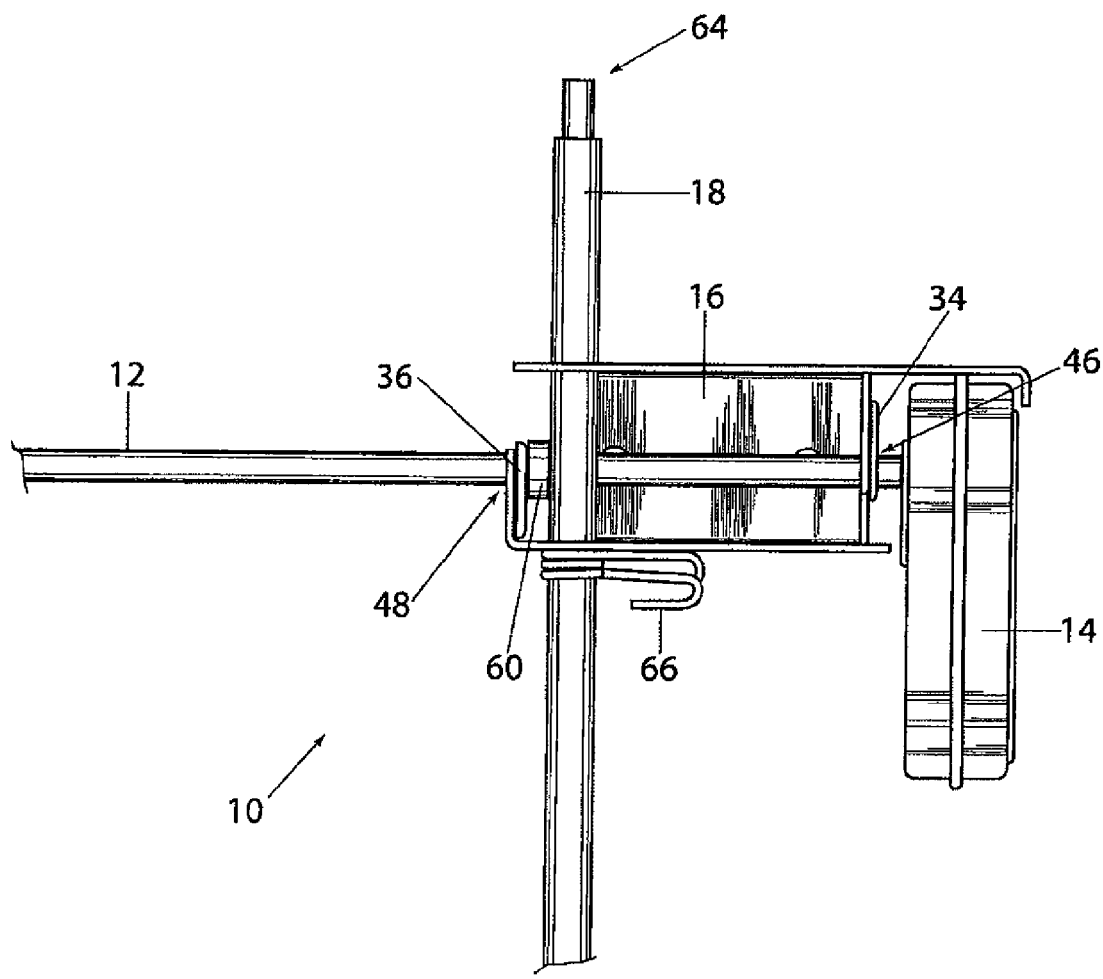
FIG. 2 is an enlarged view showing a detail of FIG. 1.

A portable rotisserie spit 10 for cooking food over a heat source is shown in an assembled condition in FIG. 1. The spit 10 includes a spit rod 12, a drive-motor 14, a carrier bracket 16 and a support post 18 as separate parts (see FIG. 3) which can be disassembled for transportation and/or storage.

The spit rod 12 is formed by a cylindrical rod that has a driven keyway 20 (or other formation) at its inner end. The drive-motor 14 is adapted to be removably mounted to the inner end of the spit rod 12 by a complementarily driving socket which receives and drivingly engages the keyway 20 of the rod 12. An outer end 26 of the spit rod 12 tapers to a point 28 to facilitate the skewering of a food item (not shown) to engage the food item for subsequent cooking.

The keyway 20 may be formed by machining the end of the spit rod 12. In an alternative, the keyway 20 is formed at the inner end of the rod 12 by press fitting or otherwise attaching a pre-formed part to the rod.

The carrier bracket 16 is open at one side to facilitate the removable rotational mounting of the spit rod 12 to the carrier bracket 16. The bracket 16 is in the form of a housing 32 able to be formed by stamping and bending a single piece of sheet metal to the required shape, with spaced apart first 34 and second bearing plates or inserts 36 attached to the housing 32. Advantageously, the plates or inserts 34 and 36 are formed from a relatively hard-wearing low-friction material that is able to withstand the temperatures it will be exposed to during cooking. The plates or inserts 34 and 36 may be formed from fibre-filled nylon or other composite materials, for example.

Bases 38 and 40 of open-ended recesses 42 and 44 formed in each of the plates or inserts 34 and 36 define spaced apart low-friction stationary upwardly facing and downwardly facing bearing surfaces that are able to slidingly contact axially spaced portions 46 and 48 of the rod 12. The rod 12 is able to be to removably mounted from the carrier bracket 16 by the bearing surfaces in a cantilever fashion to extend from the bracket 16 in a generally horizontal direction and to provide for the rotation of the rod 12 about its axis.

The plates or inserts 34 and 36 preferably taper in thickness in the regions of the recesses 42 and 44 so that the bases 38 and 40 defining the bearing surfaces are formed by edges 50 and 52 that are thinner than the rest of the plates or inserts 34 and 36. The thinner bearing edges 50 and 52 reduce the areas of sliding contact between the edges 50 and 52 and the portions 46 and 48 of the spit rod 12 to minimize frictional force inhibiting rotation of the spit rod 12.

The carrier bracket 16 has aligned circular apertures 54 and 56 for mounting the bracket 16 to the support post 18. An overhanging portion 58 extending from one end of the bracket 16 partially encloses the drive-motor 14 when the rotisserie spit 10 is assembled to retain the drive-motor 14 stationary, whereby the motor 14 will drive the spit rod 12.

To prevent the rod 12 inadvertently releasing from the carrier bracket 16 when the rod 12 is mounted from the bracket 16, the rod 12 includes a collar 60 for inhibiting movement of the rod 12 generally in the direction of its axis. In use, when the spit rod 12 is mounted to the carrier bracket 16 to cantilever the spit rod 12 from the bracket 16, the collar 60 is positioned behind the first plate or inserts 34.

The support post 18 is formed by a cylindrical rod that is able to be driven into the ground. A lower end 62 of the post 18 may be formed into a point (not shown) to facilitate driving the post 18 into the ground by striking an upper end 64 of the post 18 with a hammer, for example, with the upper end 64 of the post 18 able to received through the circular apertures 54 and 56 in the carrier bracket 16 to mount the carrier bracket 16 to swing about the axis of the post 18.

Preferably, the post 18 is stepped down in diameter at its upper end 64 where it may be struck by a hammer to drive the post 18 into the ground. Although striking the post 18 may cause its upper end 64 to burr or flare outwardly, the smaller diameter at the upper end 64 will allow it to still pass though the apertures 54 and 56 even if it becomes partially burred or flared.

Figure 3:
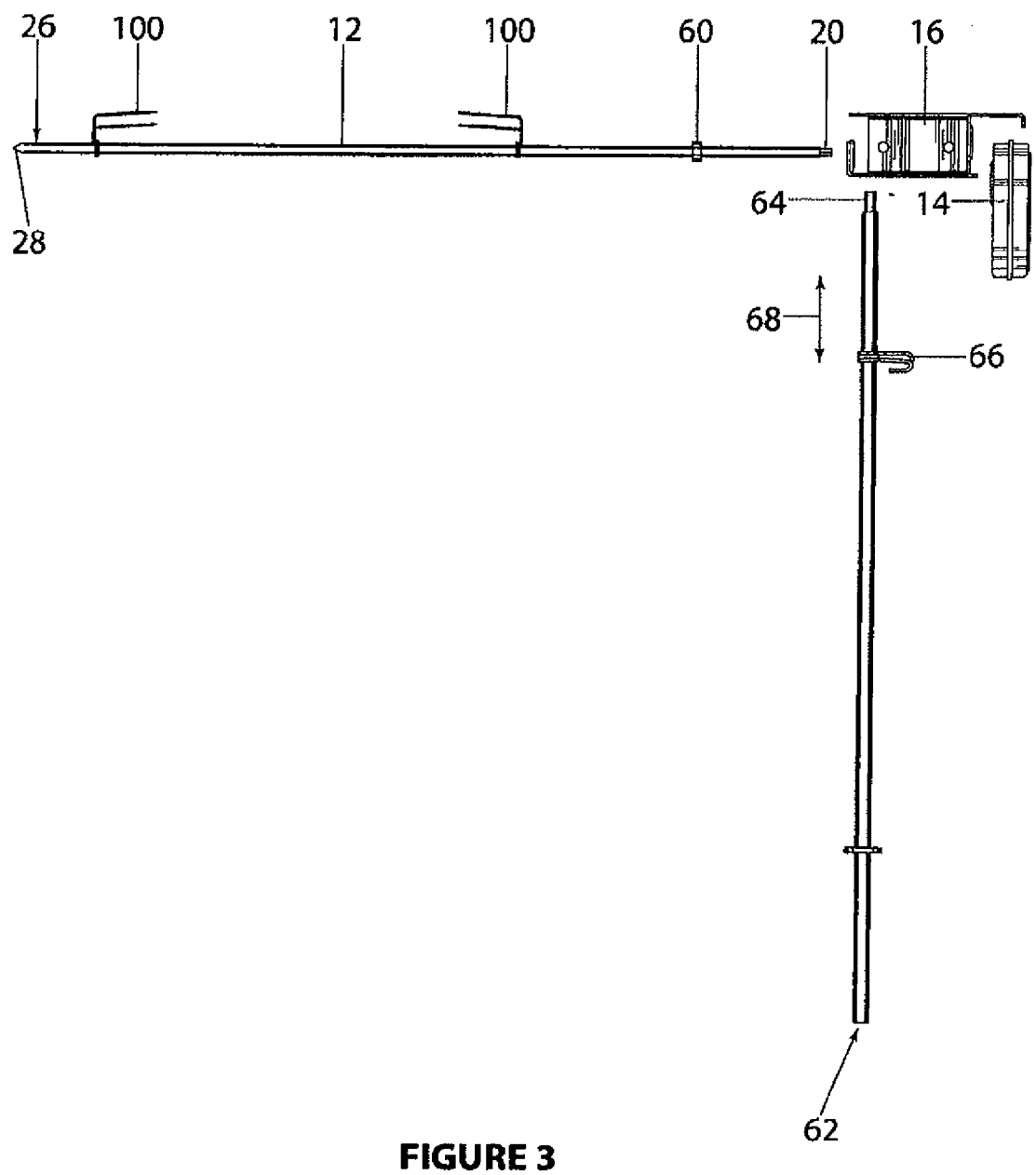
FIG. 3 is a view of the separated parts of the rotisserie spit shown in FIG. 1.
Figure 4:
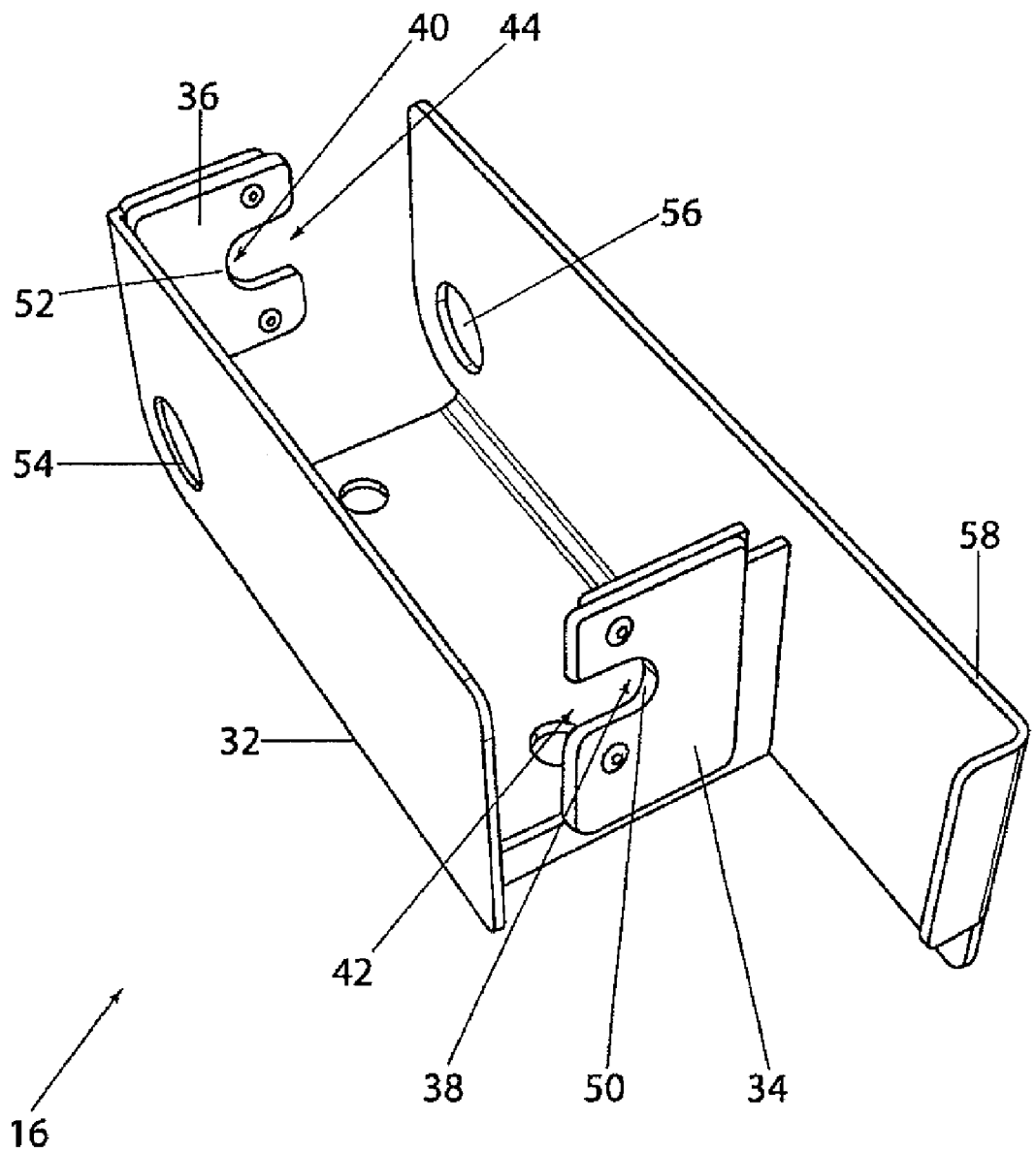
FIG. 4 is a perspective view of the carrier bracket shown in FIG. 1.

A clamp 66, the position of which is able to be adjusted up and down the support post, as indicated by the arrow 68 in FIG. 3, supports the carrier bracket 16 from the post 18. As such, the position of the clamp 66 can be used determine the height at which the spit rod 12, when it is mounted to the carrier bracket 16, is elevated above a heat source.

It will be appreciated that various other arrangements could be employed for mounting the carrier bracket 16. For example, in an alternative (not shown) the bracket 16 may be prevented from sliding down the post 18 by a through pin that is able to pass through a hole in the post 18. In a further alternative (not shown), the bracket 16 may be mounted to the post 18 such that it is unable to be moved up and down the post 18 and/or to be swung about the axis of the post 18.

An example of the assembly and subsequent use of the rotisserie spit will be described. While the rotisserie spit 10 will be described with reference to cooking meat, it will be appreciated that the spit 10 may be used to cook a range of foods. Further, while the use of exposed hot coals formed by burning down a wood fire in combination with the rotisserie spit 10 will be described for cooking the meat, it will appreciated that other heat sources may be used, including gas burners, for example.

According to one form, a wood fire is first burnt down to form hot coals or embers (not shown), such that the flames of the fire have substantially subsided to provide an appropriate heat source for cooking. While open flames may be used, they generally make it difficult to uniformly cook food using the spit 10 as they can easily burn the outer layer of food.

The support post 18 is driven into the ground adjacent the hot coals using a hammer to strike the upper end 64 of the post until the post 18 is firmly supported in the ground. The clamp 66 is then adjusted up or down the post 18 to select the height at which the carrier bracket 16 is mounted to the post 18. The carrier bracket 16 is then able to be slid over the upper end 64 of the post 18, with the circular apertures 54 and 56 of the carrier bracket 16 receiving the upper end 64 therethrough, and the carrier bracket 16 lowered down the post 18 until it rests on the clamp 66.

One or more pieces of meat (not shown), or other type of food as desired, are then able to be engaged by the spit rod 12 by pushing the rod 12 through the meat using the sharp inner end 26 of the rod 12 to skewer the meat.

The carrier bracket 16 is then able to be rotated about the support post 18 before mounting the rod 12 (and meat) to the carrier bracket 16, so that a person using the rotisserie spit 10 may safely mount the rod 12 away from the hot coals.

Figure 5:
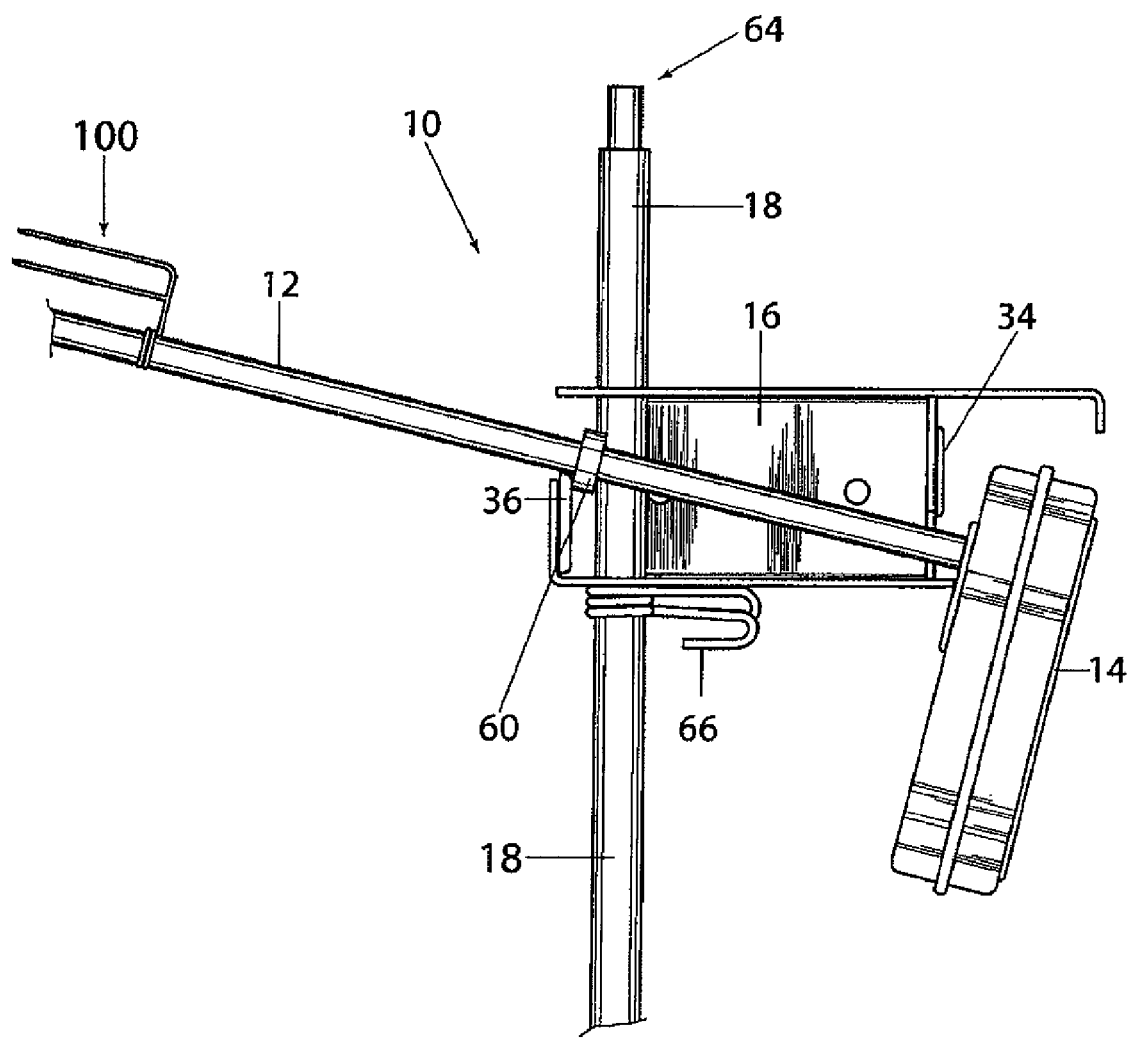
FIG. 5 is a view showing how the spit rod is mounted to the carrier bracket.

The drive-motor 14 is then mounted to the inner end 22 of the rod 12. With reference to FIG. 5, the rod 12 is held at an angle so that the rod 12 is downwardly inclined from the outer end 26 to the inner end 22. The inclined rod 12 is then able to be mounted to the carrier bracket 16 through the side opening of the bracket 16, positioning the collar 60 between the plates or inserts 34 and 36. The rod 12 is then moved to the horizontal, whereby the axially spaced portions 46 and 48 of the rod 12 are supported by the bases 38 and 40 of the recesses 42 and 44 in the plates or inserts 34 and 36. The bases 38 and 40 slidingly contact the portions 46 and 48 of the rod 12 so that the rod 12 extends horizontally from the bracket 16 in a cantilever fashion to removably mount the rod 12 from the carrier bracket 16 and to provide for the rotation of the rod 12 about its axis. As the rod 12 is moved to the horizontal, the drive-motor 14 will also come into position under the overhanging portion 58 of the carrier bracket 16.

The carrier bracket 16 is then able to be swung back about the axis of the post 18 so that the spit rod 12 and meat extend in an elevated position over the hot coals. The drive-motor 14 may then be turned on to rotate the rod 12 and meat to promote both the even cooking of the meat and the retention of natural juices within the meat.

As the rotating meat cooks above the coals, flammable fat or oil may drip from the meat onto the coals. This can result in flames flaring up from the coals that can easily burn the outer surface of the meat. To avoid the meat burning should this occur, the spit rod 12 can be swung away from the flames until such time as they subside, whereupon the spit rod 12 can be swung back over the hot coals to resume normal cooking.

The elevation of the meat above the hot coals is also able to be controlled by raising or lowering the clamp 66 on the post 18 to control the rate at which the meat is cooked.

When the meat has finished cooking, the drive-motor 14 is turned off to allow the removal of the cooked meat from the rod 12.

When cooking with a conventional spit (not shown) that supports the spit rod at both ends, the weight and temperature of the spit and food may make moving the spit and meat away from the hot coals after the meat has been cooked both dangerous and impractical, whereby the meat tends to be carved from directly above the hot coals. In consequence, a person carving meat from off the spit rod may be burnt, particularly if flammable fat or oil drip from the meat onto the coals causing flames to flare up while carving as discussed above.

In contrast, with the rotisserie spit 10 described, the spit rod 12 is able to be conveniently swung away from the hot coals, whereby the meat is able to be safely carved from off the spit rod 12.

After the spit 10 has cooled sufficiently, it may be disassembled in the reverse order to which it was assembled, for example, and the individual parts of the spit rod 12, the drive-motor 14, the carrier bracket 16 and the support post 18 cleaned and subsequently stored for later use. The components of the disassembled rotisserie spit 10 may be conveniently stored together in a compact storage and travel bag (not shown), for example, that facilitates both the tidy storage and the easy transport of the disassembled spit 10.

The rotisserie spit 10 may carry food-engaging skewers for preventing the movement of food held by the rod 12.

A conventional food-engaging skewer, such as that commonly referred to as a "barbeque spike", is formed by a collar mounted to the spit rod, with parallel prongs able to be thrust into the food. The collar is secured in position by a threaded screw. This conventional type skewer is relatively expensive to manufacture, and the screw by which the collar is secured can sometimes be difficult to tighten and loosen and, is easily lost.

Figure 6:
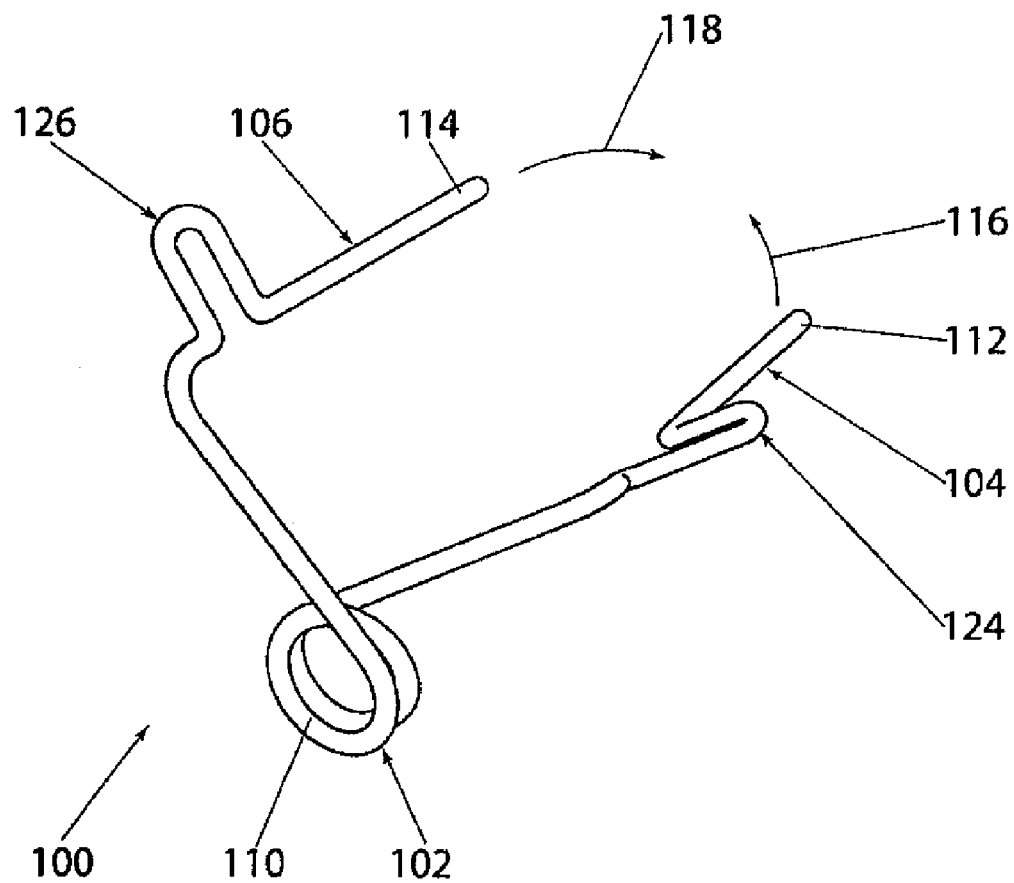
FIG. 6 is a perspective view of a preferred form of food-engaging skewer mountable on the spit rod.

With reference to FIG. 6, a preferred form of the skewer comprises a spring collar 102 that resiliently contracts to the rod 12 to secure the skewer 100 relative to the rod 12. A pair of parallel spaced apart prongs 104 and 106 that extend from the collar in a direction generally parallel to the axis of the rod 12 are able to be thrust into the food item. The collar 102 is integrally formed from a piece of resilient wire, bent to define a coil spring 110 having one or more turns. The prongs 104 and 106 are formed from the two end portions 112 and 114 of the wire extending from the coil spring 110.

The prongs 104 and 106 can be squeezed towards one another against the resilience of the collar 102, as indicated by the arrows 116 and 118 in FIG. 6, to expand and thereby loosen the collar 102. This allows the position of the skewer 100 with respect to the rod 12 to be adjusted by sliding the collar 102 along or rotating the collar 102 about the axis of the rod 12.

To facilitate the squeezing together of the prongs 104 and 106 against the resilience of the collar 102 to loosen the collar 102, the prongs 104 and 106 are preferably provided with ears 124 and 126 which are shown in FIG. 6 only. The ears 124 and 126 may be in the form of loops bent into the wire 108 to extend transversely from the prongs 104 and 106 so as to be able to be gripped between the forefinger and the thumb of a hand (not shown).

In contrast to a conventional skewer, the skewer 100 which is simply formed by bending a resilient piece of wire, is less expensive to manufacture. Further, as the skewer 100 does not require a fastener, such as a wing nut-headed screw that needs to tightened and loosened to fix it relative to the spit rod, it is quicker and simpler to use.

The skewer 100 can also be used in a conventional form of rotisserie spit.

Figure 7:
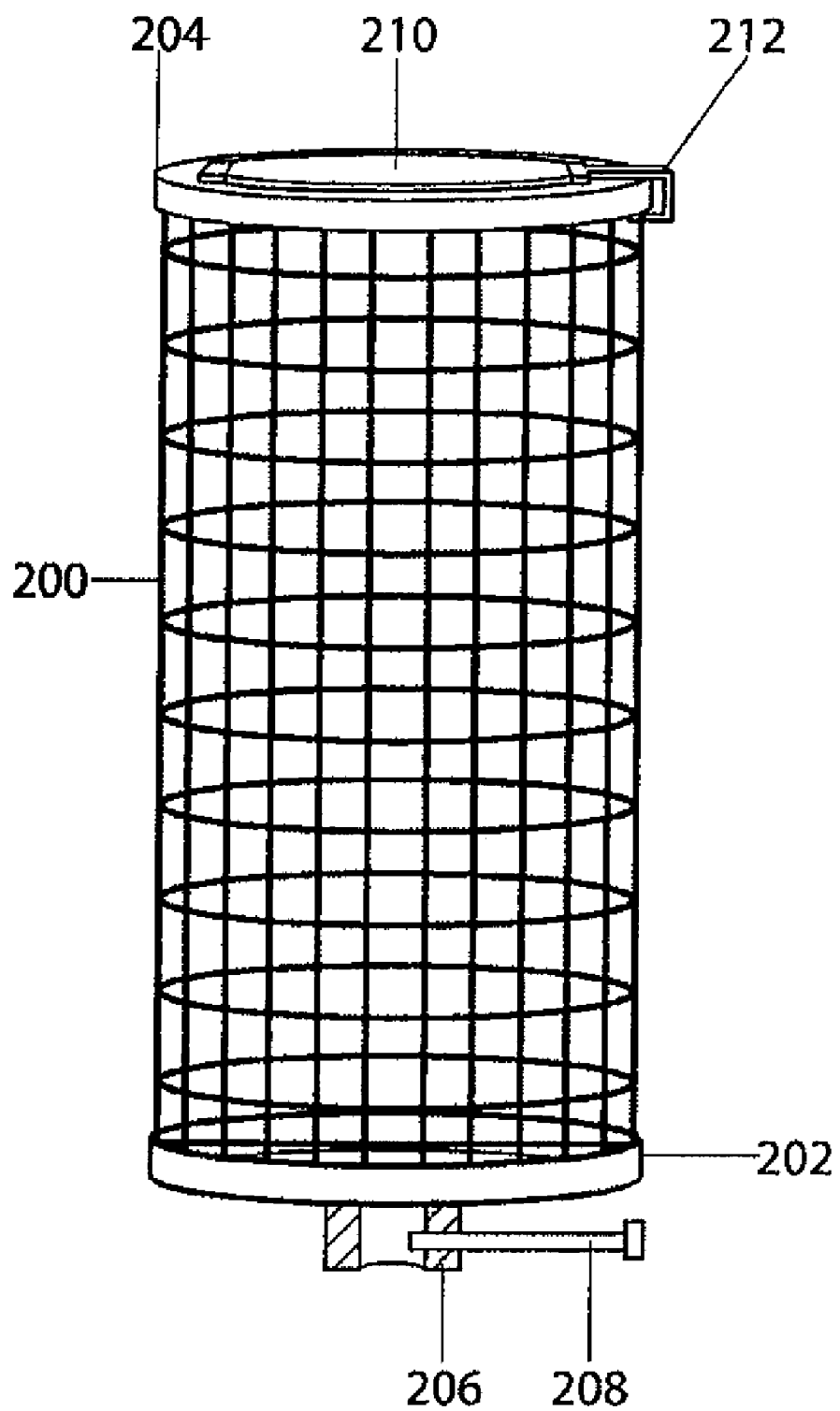
FIG. 7 is a side view of an attachment mountable on the spit rod for use in cooking vegetables.

FIG. 7 shows an attachment in the form of a holder primarily for vegetables although it is also suitable for small food products such as sausages. The attachment is designed to be fitted onto the outer end of the spit rod 12 and consists of a tubular cage 200 formed by a cylindrical wall of open structure; as shown it is formed by wire mesh, but other materials such as perforated sheet may alternatively be used. The cage 200 is closed at its inner and outer ends by caps 202, 204. The inner end cap 202 includes a bush 206 which fits over the outer end of the spit rod 12 and is secured thereto by a thumb screw 208 so that the cage is generally co-axial with the axis of the spit rod. The outer end cap 204 includes a hinged lid 210 through which product can be loaded into and removed from the cage 200. The lid 210 is retained in its closed position by a suitable fastening which in the form shown is a spring clip 212 engaged with the end cap 204. Alternatively outer end cap 204 may be removable to provide the access opening for loading and unloading of product.

When this attachment is used, vegetables can be cooked on the spit with a tumbling action within the cage to ensure uniformity of cooking.

In an alternative form (not shown) both end caps 202, 204 may be apertured to enable the spit to pass through the attachment and in that form the tubular cage itself may include a door for loading/unloading of product. However the version shown in FIG. 7 is the preferred version as the interior of the cage is unobstructed.

The foregoing describes a form of the present invention and modifications can be made without departing from the scope from the invention.

What is claimed is:

1. A rotisserie spit including a spit rod for supporting food, a carrier bracket for mounting the spit rod in cantilever fashion by bearings to permit rotation of the spit rod, the bracket being mounted to an upright support post such that the bracket and the spit rod carried thereby can swing about the axis of the post, and a motor coupled to the spit rod for driving the spit rod in rotation about its axis, wherein the bracket is removably mounted to the post and the motor is releasably engageable with an inner end of the rod to permit disassembly for transportation and storage purposes, and wherein the carrier bracket is in the form of a housing formed from sheet metal bent to required shape, and the motor is partially enclosed within the housing which retains the drive motor stationary by engagement therewith without the use of intervening fastening means.

2. A rotisserie spit according to claim 1 having a mounting attachable to the post to support the carrier bracket at an adjustable height along the post.

3. A rotisserie spit according to claim 1, wherein the bearings are slide bearings mounted to the bracket and defining seats in which the spit rod is removably mounted.

4. A rotisserie spit including:
a spit rod for supporting food;
a carrier bracket to which the spit rod is able to be removably mounted so that the rod extends substantially horizontally from the bracket in a cantilever fashion for rotation about its longitudinal axis, the carrier bracket including first and second low-friction stationary bearing surfaces which support the spit rod in cantilever fashion from the bracket and which slidingly contact axially spaced circular portions of the spit rod;
a motor for rotatably driving the spit rod; and
a support for mounting the carrier bracket at an elevated position so that the spit rod can project from the bracket over a heat source;
wherein the first and second bearing surfaces are defined by spaced upwardly facing and downwardly facing bases of respective first and second open-ended recesses formed in the carrier bracket, the carrier bracket in the form of a housing having bearing plates or inserts in which the first and second recesses are respectively formed, wherein the housing is formed from a single piece of sheet metal stamped and bent to the required shape, and the bearing plates or inserts which are attached to the housing and are formed from a relatively high-strength low-friction heat resistant material, and wherein each plate or insert tapers in a region in which the bearing surface is formed so that the bearing surface is defined by an edge that is thinner than the rest of the plate or insert.

5. A rotisserie spit according to claim 4, wherein the support for mounting the bracket is a cylindrical post, a lower end of which is adapted to be driven into the ground, and the carrier bracket is rotatably mounted to the post to provide for rotation of the carrier bracket and the spit rod about the axis of the post so as to swing the spit rod away from the heat source.

6. A rotisserie spit according to claim 5, wherein the motor is removably mounted to the rod, and the carrier bracket is removably mounted to the post, so that the components are able to be separated for transport and/or storage.

7. A rotisserie spit according to claim 4, wherein one or more food-engaging skewers are mounted to the spit rod so as to be slidable along the rod to be secured in selected positions, and having prongs that are able to be thrust into a food item.

8. A rotisserie spit according to claim 7, wherein the skewer includes a spring collar for application around the spit rod, the collar being resiliently contractable onto the rod to secure the skewer at a selected position, and the skewer having a pair of parallel prongs extending from the collar and which are able to be squeezed together against the resilience of the collar to expand the collar to facilitate movement of the collar relative to the rod.

9. A rotisserie spit according to claim 4 having an attachment mountable to the spit rod for use in cooking vegetables and like product, the attachment comprising a tubular cage mountable to the spit, the cage being loadable with product to be cooked via an access opening which can be closed whereby product within the cage can be cooked with a tumbling action upon rotation of the spit rod.

10. A skewer for holding food on a spit rod of a rotisserie spit, the skewer including a spring collar for application around the rod, the collar being able to resiliently contract to the spit rod to secure the skewer in a selected position along the rod, and substantially parallel prongs extending from the collar for thrusting through a food product, wherein the prongs are able to be squeezed together against the resilience of the collar to expand the collar to facilitate movement of the skewer relative to the rod, wherein the skewer is formed from a length of spring wire, the collar being formed in the manner of a coil spring having at least one turn and the two prongs being formed by portions of the wire extending from the coil spring in a direction generally parallel to the axis of the coil spring via connecting portions extending transverse to the axis of the coil spring and so configured that the prongs extend in a common plane spaced to one side from the axis of the coil spring, and wherein the prongs are provided with respective ear portions extending transversely from the prongs for engagement between the thumb and forefinger of the hand, the ear portions being formed by bending the wire from which the skewer is formed.

* * * * *